US012253029B2

(12) United States Patent
Briggs et al.

(10) Patent No.: US 12,253,029 B2
(45) Date of Patent: Mar. 18, 2025

(54) FUEL SYSTEM FOR DUAL USE GAS TURBINE ENGINE MAIN FUEL PUMP

(71) Applicant: Hamilton Sundstrand Corporation, Charlotte, NC (US)

(72) Inventors: Eric Briggs, Indian Trail, NC (US); Naison E. Mastrocola, Goshen, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/230,805

(22) Filed: Aug. 7, 2023

(65) Prior Publication Data
US 2025/0052199 A1 Feb. 13, 2025

(51) Int. Cl.
*F02C 7/236* (2006.01)
*F02C 7/26* (2006.01)
*F02C 9/26* (2006.01)

(52) U.S. Cl.
CPC .............. *F02C 7/236* (2013.01); *F02C 7/26* (2013.01); *F02C 9/263* (2013.01)

(58) Field of Classification Search
CPC .. F02C 7/22; F02C 7/232; F02C 7/236; F02C 7/268; F02C 7/27; F02C 7/275; F02C 7/277; F02C 7/222; F04B 41/06
See application file for complete search history.

(56) References Cited

U.S. PATENT DOCUMENTS

| 5,159,808 A | 11/1992 | Kast |
| 5,735,116 A * | 4/1998 | Mouton .................. F02C 7/268 |
| | | 60/788 |
| 7,784,441 B2 | 8/2010 | Ma et al. |
| 8,302,406 B2 | 11/2012 | Baker |
| 10,100,744 B2 * | 10/2018 | Mackin ..................... F02C 6/08 |
| 10,125,628 B2 * | 11/2018 | Nguyen ................ H02J 3/1885 |
| 10,247,102 B2 * | 4/2019 | Dreher ....................... F23K 5/04 |
| 10,669,943 B2 | 6/2020 | Weir et al. |
| 11,060,461 B2 | 7/2021 | Turney et al. |
| 11,560,854 B2 | 1/2023 | De Wergifosse et al. |
| 11,629,652 B2 | 4/2023 | Reuter et al. |

(Continued)

FOREIGN PATENT DOCUMENTS

JP 5941744 B2 5/2016

OTHER PUBLICATIONS

Extended European Search Report dated Jan. 27, 2025, for corresponding European Patent Application No. 24193114.6, 8 pgs.

*Primary Examiner* — Alain Chau
(74) *Attorney, Agent, or Firm* — Kinney & Lange, P.A.

(57) ABSTRACT

A system includes a main pump having a main pump shaft configured to connect to a gear box for driving the main pump with rotational power from the gear box in a run mode, and for driving the gear box with rotational power from the main pump in a start mode. The system includes a first fuel line with an inlet configured to connect to connected in fluid communication with a fuel source. The first fuel line includes a first branch in fluid communication with the main pump, and a second branch. A start pump is connected in fluid communication with the second branch of the first fuel line. A second fuel line connects the start pump in fluid communication with a pump management valve (PMV). A third fuel line connects the main pump in fluid communication with the pump management valve.

14 Claims, 3 Drawing Sheets

(56) References Cited

U.S. PATENT DOCUMENTS

| | | | | |
|---|---|---|---|---|
| 2006/0260323 A1* | 11/2006 | Moulebhar | ............... | F02C 6/08 |
| | | | | 60/793 |
| 2009/0211558 A1* | 8/2009 | Anson | ..................... | F02C 7/236 |
| | | | | 123/495 |
| 2010/0018182 A1* | 1/2010 | Bader | ...................... | F02C 9/30 |
| | | | | 318/400.01 |
| 2010/0126136 A1* | 5/2010 | Anson | ....................... | F02C 7/22 |
| | | | | 60/734 |
| 2012/0210716 A1* | 8/2012 | Weir | ......................... | F02C 7/22 |
| | | | | 60/734 |
| 2016/0076452 A1* | 3/2016 | Striker | .................... | F02C 7/224 |
| | | | | 60/734 |
| 2016/0108819 A1* | 4/2016 | Dreher | .................... | F02C 7/222 |
| | | | | 60/39.08 |
| 2016/0208708 A1* | 7/2016 | Butcher | .................... | B22F 5/10 |
| 2016/0369705 A1* | 12/2016 | Mackin | ..................... | F02C 6/08 |
| 2018/0283281 A1 | 10/2018 | Veilleux et al. | | |
| 2018/0298777 A1* | 10/2018 | Nguyen | .................... | F02C 7/36 |
| 2020/0088103 A1* | 3/2020 | Ajami | ....................... | F02C 7/32 |
| 2020/0191058 A1* | 6/2020 | Turney | ..................... | F02C 7/236 |
| 2020/0300168 A1 | 9/2020 | Herring et al. | | |
| 2021/0079848 A1* | 3/2021 | Cocks | ..................... | F02C 7/236 |
| 2021/0102517 A1 | 4/2021 | Susca et al. | | |
| 2021/0381439 A1* | 12/2021 | Ajami | ...................... | F02C 7/277 |
| 2022/0381187 A1* | 12/2022 | Cocks | ..................... | F02C 7/236 |
| 2023/0070280 A1* | 3/2023 | Smith | ..................... | F01D 25/20 |

* cited by examiner

FUEL SYSTEM FOR DUAL USE GAS TURBINE ENGINE MAIN FUEL PUMP

BACKGROUND

1. Field

The present disclosure relates to fuel systems, and more particularly to main fuel pump operation in gas turbine engines.

2. Description of Related Art

Large commercial gas turbine engines require dedicated air turbine starting (ATS) systems. When an engine is stationary after being operated at high temperature, convention currents can cause unequal temperatures throughout the cross-section of the engine core. Motoring the air turbine starter (ATS) can be used to rotate the engine, driver airflow, and equalize temperatures radially. However, ATS systems generally do not have fine speed control at low rotor speeds.

The conventional techniques have been considered satisfactory for their intended purpose. However, there is an ever present need for improved systems and methods for starting, operating, and motoring gas turbine engines for even cooling after operation. This disclosure provides a solution for this need.

SUMMARY

A system includes a main pump having a main pump shaft configured to connect to a gear box for driving the main pump with rotational power from the gear box in a run mode, and for driving the gear box with rotational power from the main pump in a start mode. The system includes a first fuel line with an inlet configured to be connected in fluid communication with a fuel source. The first fuel line includes a first branch in fluid communication with the main pump, and a second branch. A start pump is connected in fluid communication with the second branch of the first fuel line. A second fuel line connects the start pump in fluid communication with a pump management valve (PMV). A third fuel line connects the main pump in fluid communication with the pump management valve.

The PMV can be connected in fluid communication with the second fuel line, with the third fuel line, and with a fourth fuel line. The fourth fuel line can have an outlet configured to be connected to supply a downstream fuel system. The PMV can have a first state connecting the second fuel line in fluid communication with the third fuel line in the start mode to drive the main pump with flow pressurized by the start pump. A second state of the PMV can connect the third fuel line in fluid communication with the fourth fuel line for supplying fuel from the main pump to the outlet of the fourth fuel line in the run mode.

In the run mode, the PMV can connect the third and fourth fuel lines in fluid communication to bypass flow in the from the main pump back to the main pump through the fifth line and through the start pump, for electrical energy recovery by using the start pump to drive an electric machine for electric power generation.

A fuel metering component can be included in the fourth line, configured to meter flow from the outlet of the fourth line in the run and start modes. A regeneration fuel line can connect the fuel metering component in fluid communication with the start pump in the regeneration sub-mode to supply fuel flow to the start pump.

The system can include the gear box, wherein the main pump shaft is connected to drive the gear box in the start mode, and wherein the gear box is connected to drive the main pump shaft for fuel pumping in the run mode. The gear box can be connected to drive an engine shaft in the start mode, and to be driven by the engine shaft in the run mode. A fuel oil manifold (FOM) can be connected in fluid communication to receive fuel supplied from the fourth line. A solenoid in a fifth line can selectively connect the PMV in fluid communication with the FOM, bypassing the fuel metering component.

The main pump can be a positive displacement pump. The start pump can be a positive displacement pump. An electric machine can be configured to drive the start pump in the start mode. The electric machine can be configured to be driven by the start pump in the run mode for generating electrical power from bypass flow of the main pump. A controller can be connected for active control of the PMV and the electrical motor for changing between the start mode and the run mode.

A method includes providing pressurized fuel from a start pump to a main pump to drive the main pump, and using the main pump to drive a gear box for starting a gas turbine engine. The method includes after starting the gas turbine engine, using the main pump to supply fuel to the gas turbine engine.

Providing pressurized fuel from the start pump can include driving the start pump with an electric motor. The method can include supplying fuel from the start pump to the gas turbine engine during start up. The method can include flowing fuel from the main pump through the start pump after starting the gas turbine engine for cooling the start pump. The method can include driving the start pump with flow from the main pump, and using the start pump to drive an electric machine to generate electrical power after starting the gas turbine engine. The method can include after shutting down the engine, driving flow through the main pump with flow pressurized by the start pump to motor the gas turbine engine for uniform cooling of the gas turbine engine.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
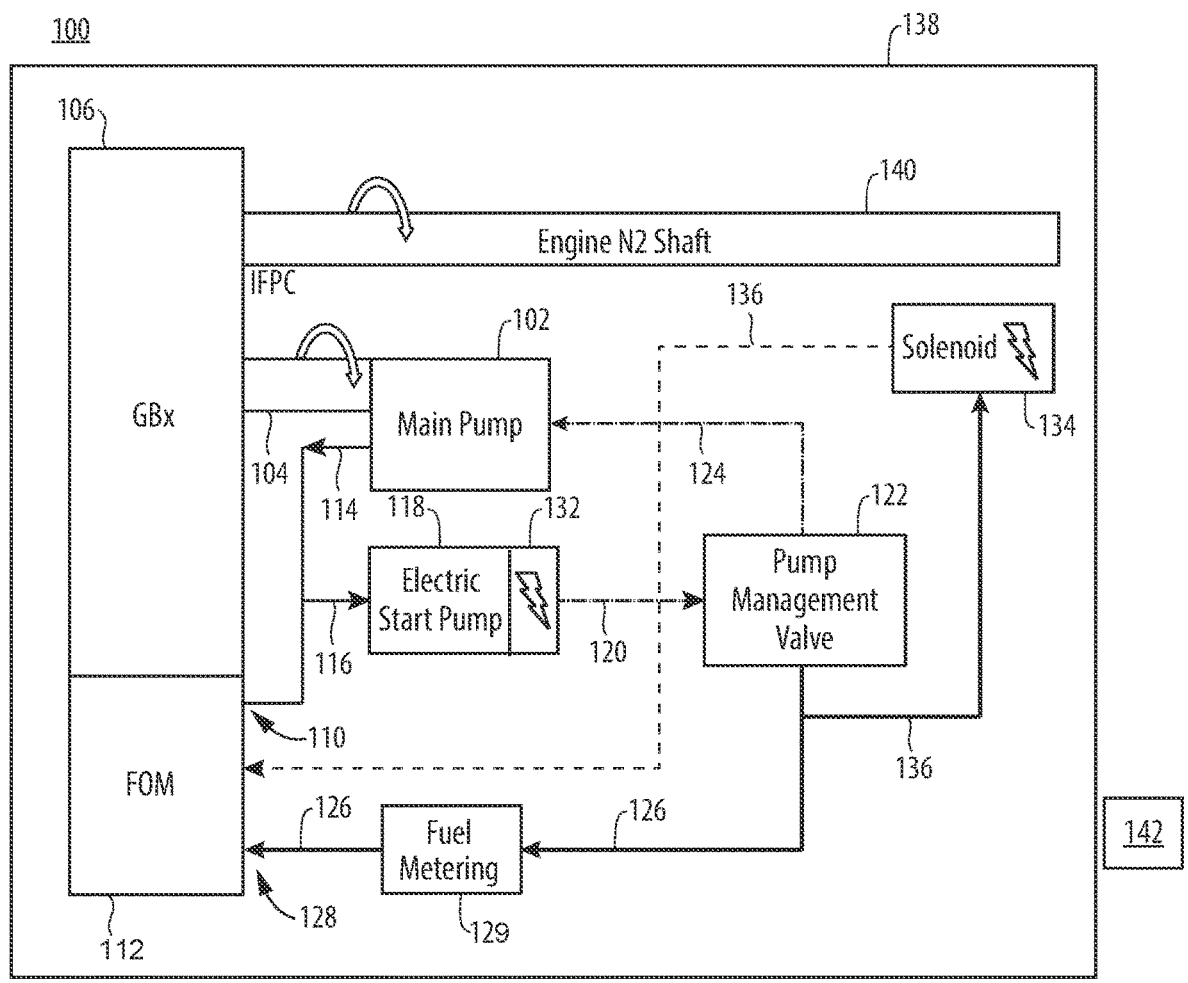
FIG. 1 is a schematic view of an embodiment of a system constructed in accordance with the present disclosure, showing the system in start mode.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide fuel flow and rotational drive for starting a gas turbine engine, to provide for low speed motoring of the engine after shut down, and to provide for fuel flow and potentially electrical power generation during normal operation.

Large commercial aero engines require traditionally dedicated air turbine starting systems. Such systems generally do not have fine speed control at low rotor speeds. Systems and methods disclosed herein can utilize fueldraulics to rotate the engine N2 shaft instead of pneumatics to enable slow/variable speed motoring, start, and bypass electrical energy recovery.

Figure 2:
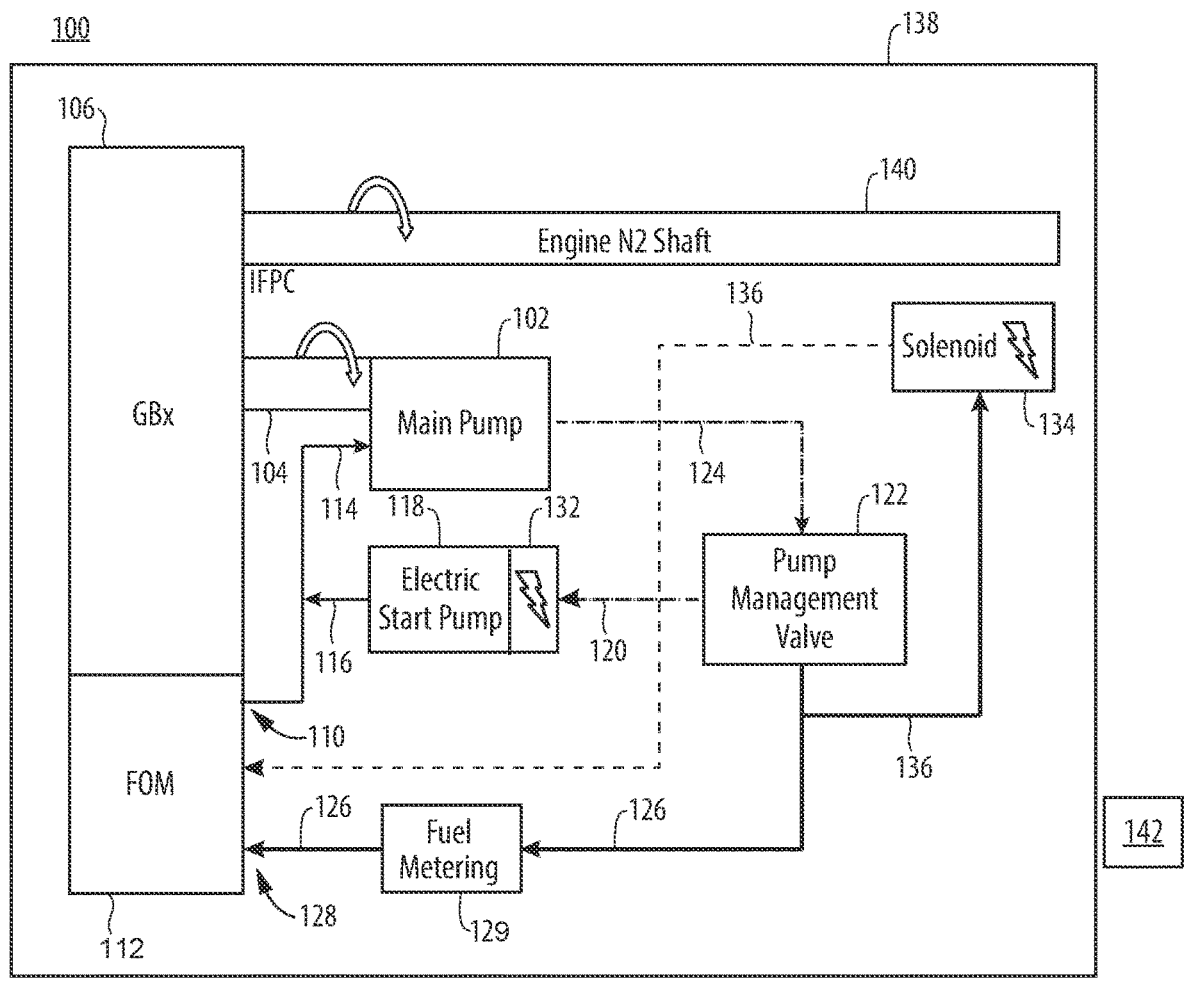
FIG. 2 is a schematic view of the system of FIG. 1, showing the system in run mode.
Figure 3:
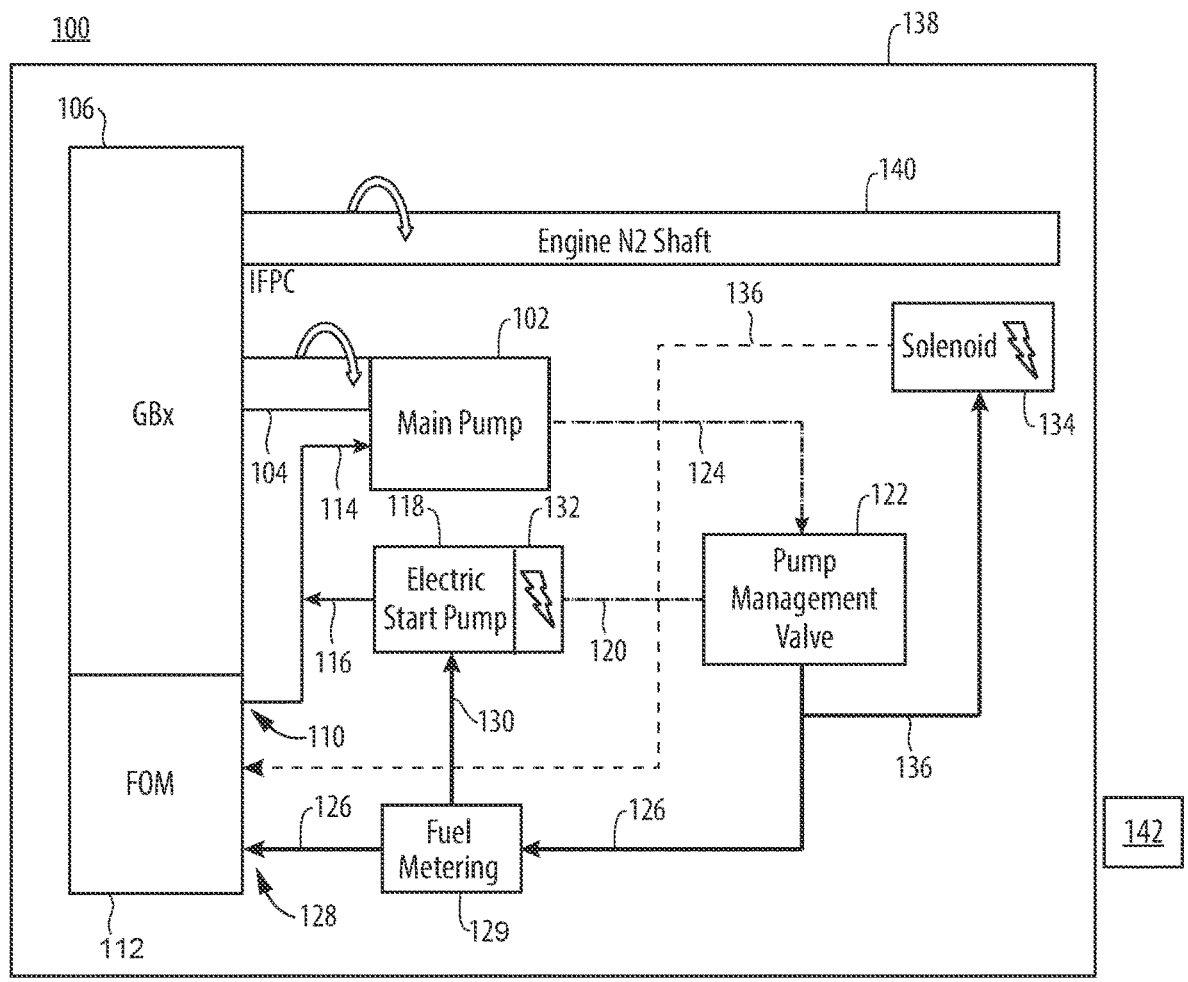
FIG. 3 is a schematic view of the system of FIG. 1, showing the system in a regeneration sub-mode of the run mode.

The system 100 includes a main pump 102 having a main pump shaft 104 connected to a gear box 106 for driving the main pump 102 with rotational power from the gear box 106 in a run mode shown in FIGS. 2 and 3, and for driving the gear box 106 with rotational power from the main pump 102 in a start mode shown in FIG. 1. The main pump 102 can be a positive displacement pump, e.g. vane, gear, piston, gerotor, or the like.

The system 100 includes a first fuel line 108 with an inlet 110 configured to be connected in fluid communication with a fuel source, e.g. an aircraft fuel tank connected to the fuel oil manifold (FOM) 112. The first fuel line 108 includes a first branch 114 in fluid communication with the main pump 102, and a second branch 116. A start pump 118 is connected in fluid communication with the second branch 116 of the first fuel line 108. The start pump 118 is a positive displacement pump. A second fuel line 120 connects the start pump 118 in fluid communication with a pump management valve (PMV) 122. A third fuel line 124 connects the main pump 102 in fluid communication with the pump management valve 122. The PMV 122 is connected in fluid communication with the second fuel line 120, with the third fuel line 124, and with a fourth fuel line 126. The fourth fuel line 126 has an outlet 128 configured to be connected to supply a downstream fuel system, i.e. to the FOM 112.

As shown in FIG. 1, the PMV 122 has a first state connecting the second fuel line 120 in fluid communication with the third fuel line 124 in the start mode to drive the main pump 102 with flow pressurized by the start pump 118. This state of the PMV also allows flow from the start pump 118 to the fourth fuel line 126 to supply the fuel metering system or component 129 in the fourth fuel line 126 with fuel pressurized by the start pump 118 for use by the engine during engine startup. The fuel metering component 129 is included in the fourth line 126, configured to meter flow from the outlet 128 of the fourth fuel line 126 to the FOM 112 in the run and start modes.

As shown in FIG. 2, a second state of the PMV 122 connects the third fuel line 124 in fluid communication with the fourth fuel line 126 for supplying fuel from the main pump 102 to the outlet 128 of the fourth fuel line 126 to supply the downstream fuel system including the FOM 112 and gas generators of a gas turbine engine in the run mode, i.e. after starting of the engine. In the run mode, the PMV 122 connects the second and third lines 120, 124 in limited fluid communication to flow a limited amount of fuel through the start pump 118, i.e. in reverse flow from the start mode in FIG. 1, for cooling the start pump 119. Start pump cooling may be required to manage the temperature of the start pump and corresponding fluid passages, which are likely to be located in the hot engine bay. Negative impacts of high temperatures can include reduced electronics life and unwanted carbon deposits. For purposes of this disclosure, this aspect of the system can be present or not, depending on the application.

With reference now to FIG. 3, in a regeneration sub-mode of the run mode e.g. at high engine speeds such as when an aircraft is cruising, the PMV 122 connects the second and third fuel lines 120, 124 in fluid communication to supply the FOM 112 as in the run mode of FIG. 2, and can connect a the fuel metering component 129 to the start pump 118 through a fifth line 130. The fifth line 130 connects the fuel metering component 129 to the start pump 118 to bypass flow in the from the main pump 102 back to the inlet of the main pump 102 in the first line 108 through the start pump 118. The fifth line 130 is a regeneration fuel line that connects the fuel metering component 129 in fluid communication with the start pump 118 in the regeneration sub-mode to supply fuel flow to the start pump 118 This bypass flow accommodates high engine speeds acting on the fixed displacement main pump 102 and can drive the start pump 102 for electrical energy recovery by using the start pump 102 to drive an electric machine 132 for electric power generation, but the bypass for electrical regeneration can apply even if a non-fixed displacement pump is used for the main pump 102

The system 100 can include the gear box 106, wherein the main pump shaft 104 is connected to drive the gear box 106 in the start mode of FIG. 1, and wherein the gear box 106 is connected to drive the main pump shaft 104 for fuel pumping in the run modes of FIGS. 2-3. The gear box 106 is connected to drive an engine shaft 140, e.g. an engine N2 shaft, i.e. the high speed shaft of the engine, in the start mode of FIG. 1, and to be driven by the engine shaft 140 in the run mode of FIGS. 2-3. The system can include the FOM 112 connected in fluid communication to receive fuel supplied from the fourth line 126. A solenoid 133 in the IFPC 138 can be connected to supply in a sixth line 136 selectively connecting the PMV 122 in fluid communication with the FOM 112, bypassing the fuel metering component 129. The solenoid 133 can provide a way for the aircraft to control the PMV 122. Typical implementations require supplying a high and low pressure to the solenoid 133, which then translated an electrical command from the electronic engine controller into a hydraulic command that is sent to the valve. In FIG. 1, the solenoid 133 is shown de-energized and the PMV 122 is in run mode. This polarity could be swapped. The high pressure side is shown connected downstream of the PMV 122 to show that it is connected to the highest pressure source regardless of engine state (main or start driving). The main pump, its shaft 104, the start pump 118 and its motor/generator 132, the PMV 122, the fuel metering component 129, the solenoid 134, and the fuel lines 108, 120, 124, 126, 130, 139, 136 can all be housed in a line replaceable unit (LRU), i.e. an integrated fuel pump and control (IFPC) 138.

The electric machine 132 is a motor/generator that is configured to drive the start pump 118 in the start mode of FIG. 1, and to be driven by the start pump 118 in the run mode, specifically the regeneration sub-mode shown in FIG. 3, for generating electrical power from bypass flow of the main pump 102. A controller 142 can be connected for active control of the PMV 122, the solenoid 134, and the and the electric machine 132 for changing between the start mode of FIG. 1, the run mode of FIG. 2, and the regeneration sub-mode of the run mode in FIG. 3.

With continued reference to FIGS. 1-3, a method includes providing pressurized fuel from a start pump (e.g. start pump 118) to a main pump (e.g. main pump 102) to drive the main pump, and using the main pump to drive a gear box (e.g. gear box 106) for starting a gas turbine engine. The method includes after starting the gas turbine engine, using the main pump to supply fuel to the gas turbine engine. Switching between start mode and run mode can occur when the N2 shaft speed of the engine is 45% of its top speed.

Providing pressurized fuel from the start pump includes driving the start pump with an electric motor (e.g. electric machine 132). The method includes supplying fuel from the start pump to the gas turbine engine during start up as shown in FIG. 1. The method includes flowing fuel from the main pump through the start pump after starting the gas turbine engine for cooling the start pump as shown in FIG. 2. The method includes driving the start pump with flow from the main pump, and using the start pump to drive an electric machine to generate electrical power after starting the gas turbine engine, as shown in FIG. 3. The method includes after shutting down the engine, driving flow through the main pump with flow pressurized by the start pump to motor the gas turbine engine for uniform cooling of the gas turbine engine. This mode can follow the same flow scheme as shown in FIG. 1 for startup, but can be done without burning fuel in the gas generator of the gas turbine engine. Variable rotation rates can be achieved hydraulically while starting the gas turbine engine and after starting the gas turbine engine by modulating a pump management valve (e.g. PMV 122) connected in fluid communication with the main pump and with the start pump, and/or electrically by using a variable speed electric motor drive to control the start pump.

Systems and methods as disclosed herein provide potential benefits including the following. The provide for dual use of an electric start pump. They provide dual use of the main fuel pump. They enable slow motoring of the engine shaft. They allow for replacement of pneumatic engine starting systems and the associated components. They allow energy recapture from waste fuel flow.

The methods and systems of the present disclosure, as described above and shown in the drawings, provide for fuel flow and rotational drive for starting a gas turbine engine, provide for low speed motoring of the engine after shut down, and provide for fuel flow and potentially electrical power generation during normal operation. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a main pump having a main pump shaft configured to connect to a gear box for driving the main pump with rotational power from the gear box in a run mode, and for driving the gear box with rotational power from the main pump in a start mode;
   a first fuel line with an inlet configured to be connected in fluid communication with a fuel source, wherein the first fuel line includes a first branch in fluid communication with the main pump, and a second branch;
   a start pump connected in fluid communication with the second branch of the first fuel line;
   a second fuel line connecting the start pump in fluid communication with a pump management valve (PMV); and
   a third fuel line connecting the main pump in fluid communication with the pump management valve; and
   an electric machine configured to drive the start pump in the start mode, and wherein the electric machine is configured to be driven by the start pump in the run mode for generating electrical power from bypass flow of the main pump.

2. The system as recited in claim 1, wherein the PMV is connected in fluid communication with the second fuel line, with the third fuel line, and with a fourth fuel line, wherein the fourth fuel line has an outlet configured to be connected to supply a downstream fuel system, wherein the PMV has a first state connecting the second fuel line in fluid communication with the third fuel line in the start mode to drive the main pump with flow pressurized by the start pump, and a second state connecting the third fuel line in fluid communication with the fourth fuel line for supplying fuel from the main pump to the outlet of the fourth fuel line in the run mode.

3. The system as recited in claim 2, wherein in the run mode, the PMV connects the second and third lines in limited fluid communication to flow a limited amount of fuel through the start pump for cooling.

4. The system as recited in claim 2, wherein in a regeneration sub-mode of the run mode, the PMV connects the third and fourth fuel lines in fluid communication to bypass flow from the main pump back to the main pump through a fifth line and through the start pump, for electrical energy recovery by using the start pump to drive an electric machine for electric power generation.

5. The system as recited in claim 4, further comprising a fuel metering component in the fourth line, configured to meter flow from the outlet of the fourth line in the run and start modes, and wherein a regeneration fuel line connects the fuel metering component in fluid communication with the start pump in the regeneration sub-mode to supply fuel flow to the start pump.

6. The system as recited in claim 1, further comprising the gear box, wherein the main pump shaft is connected to drive the gear box in the start mode, and wherein the gear box is connected to drive the main pump shaft for fuel pumping in the run mode.

7. The system as recited in claim 6, wherein the gear box is connected to drive an engine shaft in the start mode, and to be driven by the engine shaft in the run mode.

8. The system as recited in claim 7, further comprising a fuel oil manifold (FOM) connected in fluid communication to receive fuel supplied from a fourth line.

9. The system as recited in claim 8, further comprising a solenoid in a fifth line selectively connecting the PMV in fluid communication with the FOM, bypassing a fuel metering component.

10. The system as recited in claim 1, wherein the main pump is a positive displacement pump.

11. The system as recited in claim 1, wherein the start pump is a positive displacement pump.

12. The system as recited in claim 1, further comprising a controller connected for active control of the PMV and the electrical motor for changing between the start mode and the run mode.

13. A system comprising:
   a main pump having a main pump shaft configured to connect to a gear box for driving the main pump with rotational power from the gear box in a run mode, and for driving the gear box with rotational power from the main pump in a start mode;

a first fuel line with an inlet configured to be connected in fluid communication with a fuel source, wherein the first fuel line includes a first branch in fluid communication with the main pump, and a second branch;

a start pump connected in fluid communication with the second branch of the first fuel line;

a second fuel line connecting the start pump in fluid communication with a pump management valve (PMV); and a third fuel line connecting the main pump in fluid communication with the pump management valve; and wherein the PMV is connected in fluid communication with the second fuel line, with the third fuel line, and with a fourth fuel line, wherein the fourth fuel line has an outlet configured to be connected to supply a downstream fuel system, wherein the PMV has a first state connecting the second fuel line in fluid communication with the third fuel line in the start mode to drive the main pump with flow pressurized by the start pump, and a second state connecting the third fuel line in fluid communication with the fourth fuel line for supplying fuel from the main pump to the outlet of the fourth fuel line in the run mode; and wherein in a regeneration sub-mode of the run mode, the PMV connects the third and fourth fuel lines in fluid communication to bypass flow from the main pump back to the main pump through a fifth line and through the start pump, for electrical energy recovery by using the start pump to drive an electric machine for electric power generation.

14. The system as recited in claim 13, further comprising a fuel metering component in the fourth line, configured to meter flow from the outlet of the fourth line in the run and start modes, and wherein a regeneration fuel line connects the fuel metering component in fluid communication with the start pump in the regeneration sub-mode to supply fuel flow to the start pump.

* * * * *